United States Patent
Rothamel

(10) Patent No.: US 6,928,871 B2
(45) Date of Patent: Aug. 16, 2005

(54) METHOD AND APPARATUS FOR CENTEREDLY CLAMPING A MOTOR VEHICLE WHEEL ON A MAIN SHAFT OF A WHEEL BALANCING MACHINE

(75) Inventor: Karl Rothamel, Ober-Ramstadt (DE)

(73) Assignee: Snap-On Equipment GmbH (DE)

( * ) Notice: Subject to any disclaimer, the term of this patent is extended or adjusted under 35 U.S.C. 154(b) by 0 days.

(21) Appl. No.: 10/427,492

(22) Filed: May 1, 2003

(65) Prior Publication Data

US 2004/0035203 A1 Feb. 26, 2004

(30) Foreign Application Priority Data

Aug. 21, 2002 (DE) .......................................... 102 38 271

(51) Int. Cl.⁷ .............................................. G01M 1/06
(52) U.S. Cl. ........................................................ 73/487
(58) Field of Search ......................... 73/487, 460, 462; 301/5.21, 5.22

(56) References Cited

U.S. PATENT DOCUMENTS

| | | | | |
|---|---|---|---|---|
| 3,165,932 A | * | 1/1965 | Hemmeter | 73/484 |
| 4,118,989 A | * | 10/1978 | Wood | 73/487 |
| 4,168,627 A | * | 9/1979 | Held et al. | 73/487 |
| 4,275,594 A | * | 6/1981 | Varga et al. | 73/487 |
| 5,615,574 A | * | 4/1997 | Drechsler et al. | 73/487 |
| 5,703,291 A | | 12/1997 | Rossteuscher | 73/487 |
| 5,777,224 A | * | 7/1998 | Coetsier et al. | 73/487 |
| 5,900,548 A | * | 5/1999 | Buzzi | 73/487 |
| 5,948,980 A | * | 9/1999 | Rossteuscher | 73/487 |
| 6,481,282 B2 | * | 11/2002 | Douglas et al. | 73/461 |

FOREIGN PATENT DOCUMENTS

| | | | |
|---|---|---|---|
| EP | 0 550 816 B1 | | 3/1996 |
| GB | 2195155 | * | 3/1988 |

* cited by examiner

Primary Examiner—Helen C. Kwok
(74) Attorney, Agent, or Firm—Ostrolenk, Faber, Gerb & Soffen, LLP

(57) ABSTRACT

In a method and an apparatus for centeredly clamping a motor vehicle wheel on a shaft of a wheel balancing machine the wheel is first clamped on a centering cone member mounted on the main shaft and then a post-centering operation is effected wherein the wheel is at least partially released, with the wheel being rotated with respect to its initial rotary angle position through about 180°, and then the wheel is clamped on the shaft again.

19 Claims, 1 Drawing Sheet

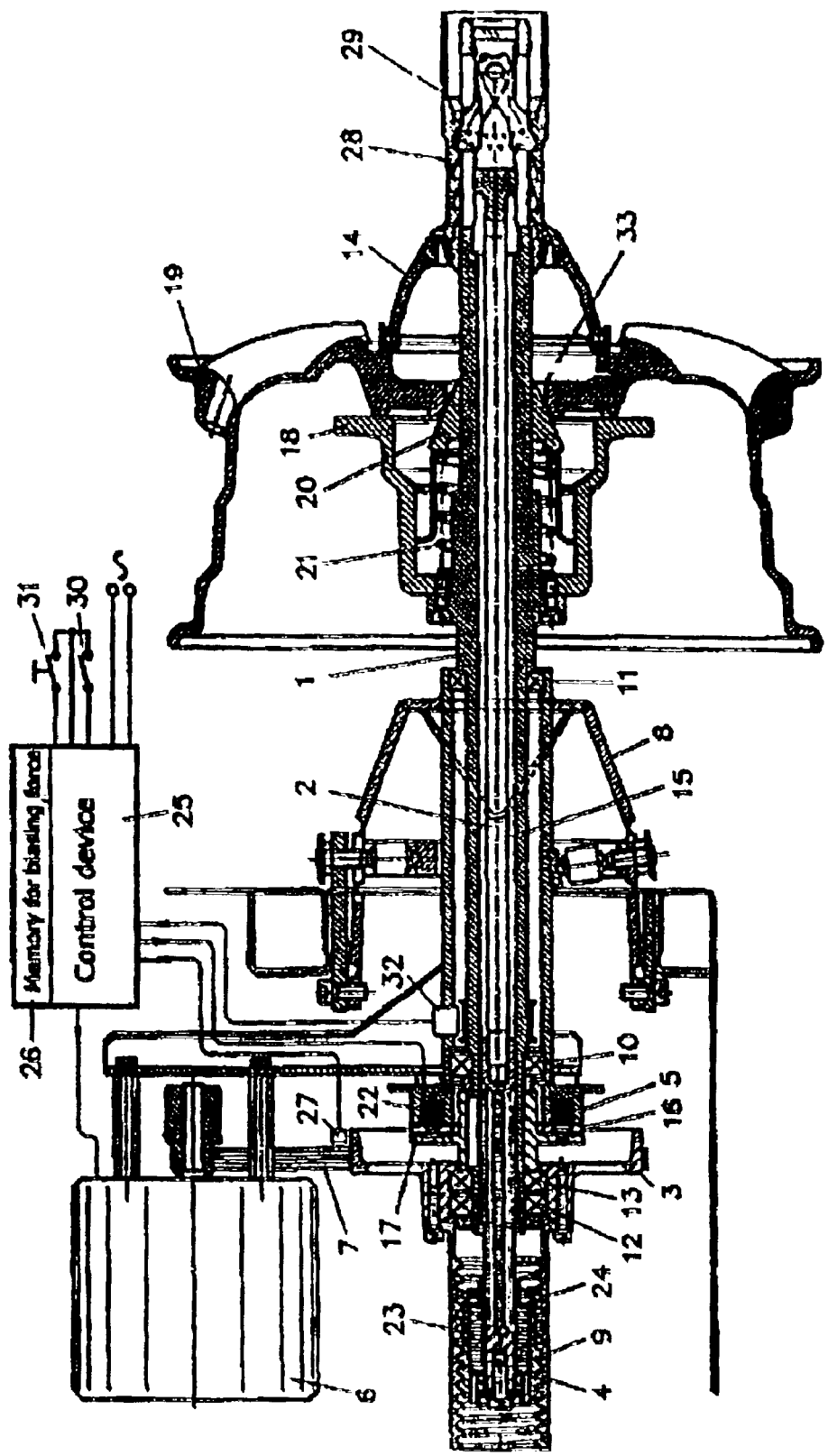

METHOD AND APPARATUS FOR CENTEREDLY CLAMPING A MOTOR VEHICLE WHEEL ON A MAIN SHAFT OF A WHEEL BALANCING MACHINE

FIELD OF THE INVENTION

The invention concerns a method and an apparatus for centeredly clamping a motor vehicle wheel on a main shaft of a wheel balancing machine.

BACKGROUND OF THE INVENTION

One form of a method of centeredly clamping a motor vehicle wheel on a main shaft of a balancing machine for balancing the wheel provides that the wheel is clamped, with an axially directed clamping force, on a centering cone member which is appropriately mounted on the shaft of the machine. A biasing force is directed axially in opposite relationship with respect to the clamping force, and is operable to act between the wheel and the centering cone member. In the apparatus for implementing such a method the apparatus, besides the centering cone member arranged on the main shaft coaxially with respect thereto, comprises clamping means which are actuated for movement axially with respect to the main shaft by an electric motor, for selectively clamping and releasing the wheel in relation to the centering cone member. The biasing force directed in opposite relationship to the clamping force is produced for example by means of a spring. Reference may be made in this respect to U.S. Pat. No. 5,615,574, corresponding to EP 0 550 816 B1 and DE 42 00 380 C2.

The wheel is clamped to the main shaft of the balancing machine and released therefrom by virtue of axial movements of a pull rod which is passed through an axial bore in the main shaft. The axial movement of the pull rod which is used to clamp and release the wheel is produced by the above-mentioned electric motor which constitutes a rotary drive, the rotary movement of which is converted into a linear movement of the pull rod.

In order to achieve adequate centering of the motor vehicle wheel on the main shaft, it is necessary to lift the motor vehicle wheel and push it up over the tapering clamping surface of the centering cone member. The force which is required for that purpose has to be furnished by an operator or by an additional mechanical wheel-positioning unit which is provided with a lifting drive. There is however the danger in that respect that the wheel is not exactly fitted with the central bore thereof on to the centering cone member, before the wheel is clamped in position by operation of the clamping means. That can give rise to centering errors which can consequentially result in falsification of unbalance measurement values ascertained in a measuring run of the unbalance measuring apparatus. Centering errors of 1/10 mm already cause serious deviations from the actual correct unbalance values.

STATEMENT OF THE INVENTION

An object of the present invention is to provide a method which can effect precise centering of a motor vehicle wheel to be balanced on the main shaft of a wheel balancing machine.

A further object of the invention is to provide a method of centeredly clamping a motor vehicle wheel on a shaft of a wheel balancing machine, which affords reliable accurate centering of the motor vehicle wheel on the shaft while involving an operating procedure that is simple to implement.

A further object of the invention is to provide an apparatus for centeredly clamping a motor vehicle wheel on a wheel balancing machine shaft, which can afford accurate centering while retaining a relatively simple apparatus structure.

In accordance with the invention in the method aspect the foregoing and other objects are attained by a method of centeredly clamping a motor vehicle wheel on a main shaft of a balancing machine, in which the wheel is clamped with an axially directed clamping force against a centering cone member mounted on the shaft, a bias directed axially in opposite relationship with respect to the clamping force acting between the wheel and the centering cone member. In a post-centering operation, the wheel is at least partially released, the wheel being slowly rotated through at least about 180° prior to or during the release phase, and then the wheel is clamped again. It will be noted however that the rotary movement of the wheel can also take place after release of the wheel.

The biasing force which obtains between the wheel and the centering cone member and which is directed axially in opposite relationship with respect to the clamping force upon clamping of the wheel provides that the wheel is self-centered on the centering cone member. If it occurs that, in the initial clamping operation, the wheel does not fit against the centering cone member in contact thereagainst all around same, for example by virtue of the force of gravity acting on the wheel to cause it to be off-center in relation to the centering cone member, then the wheel will be automatically centered on the centering cone member after a rotary movement through about 180° assisted by the biasing force, as the position of the center of gravity of the wheel has then been moved from a position below the axis of the centering cone member, into a position above that axis. The biasing force which in conventional manner can be produced by a spring such as a compression spring is so high that the wheel is then held in the self-centered position against the centering cone member, and then the wheel is clamped again by actuation of the clamping means. The wheel is then disposed in an exactly centered position and the geometrical axis of the wheel and the axis of rotation of the shaft of the balancing machine coincide.

The post-centering operation is preferably effected at the beginning of an unbalance measuring run, the wheel being rotated at a substantially lower rotary speed than in the unbalance measuring run, being rotated for example by hand or by the electric motor. The procedure involved in the post-centering operation can be implemented automatically or can be activated by program selection. The movement by which the wheel is released in the post-centering operation can be sensed. In that case the degree of at least partial release of the wheel can be adjusted or controlled, in dependence on the force of the biasing effect. Preferably, the current flowing in the electric motor in the release phase is measured, in which case the released condition of the wheel can be detected from the drop in current. Preferably in the wheel-release operation the wheel is stopped in a rotary angle position which corresponds to a rotary movement of about 180°. There is no need for the wheel to be stopped exactly in a rotary angle position of 180°. Deviations therefrom of the order of magnitude of between about 15° and 20° in both directions of rotation can already provide for the desired wheel self-centering effect on the centering cone member, in which the wheel moves downwardly into the exactly centered position by virtue of the force of gravity acting thereon, when the wheel is at least partially released. The wheel is then clamped again against the centering cone member.

It will be appreciated that the operation of post-centering of the wheel can also be repeated one or more times.

In a preferred feature control of the steps involved in the post-centering operation is effected by an electronic control device which is appropriately programmed and which can be provided in or integrated into the electronic system of the machine.

In accordance with the principles of the invention in the apparatus aspect the foregoing and other objects are attained by an apparatus for centeredly clamping a motor vehicle wheel on a shaft of a balancing machine comprising a centering cone member arranged coaxially with respect to the shaft and clamping means drivable axially with respect to the shaft by an electric motor, for selectively clamping and releasing the wheel. For motion-control of the clamping means, the apparatus further includes an additional control device and a sensing device connected to the control device and operable to sense the movement of the clamping means. The control device is programmed or programmable in such a way that, when an unbalance measuring operation starts, the clamping means are controlled into a release position when the wheel is rotated through about 180°.

Further objects, features and advantages of the invention will be apparent from the description hereinafter of a preferred embodiment.

BRIEF DESCRIPTION OF THE DRAWING

The drawing is a view in section of an apparatus for centeredly clamping a motor vehicle wheel on a shaft of a balancing machine.

DESCRIPTION OF THE PREFERRED EMBODIMENT

It will first be noted that the apparatus for centeredly clamping a motor vehicle wheel on a shaft of a balancing machine is of a basic structure as is to be found for example in U.S. Pat. No. 5,615,574 to which attention is therefore directed for appropriate incorporation of the disclosure.

The embodiment illustrated in the drawing shows parts of a wheel balancing machine, which serve to more fully describe the present invention. Thus, reference numeral 2 denotes a pulling rod or bar which extends through an axial bore 15 in a main shaft 1 of the wheel balancing machine and which is supported axially movably in both directions in the shaft 1. The pulling rod 2 is preferably arranged in such a way as to be prevented from rotating with respect to the main shaft 1.

Disposed at the end of the pulling rod 2, which projects beyond the main shaft 1, being therefore the right-hand end in the FIGURE, are clamping means with which, in conjunction with axial displacement of the pulling rod 2, a motor vehicle wheel 19 of which the FIGURE shows the disk wheel itself without a tire mounted thereon can be appropriately clamped on the main shaft 1.

The clamping means include a centering cone member 20 which is supported on the main shaft 1 displaceably in the axial direction thereof, in coaxial relationship therewith. The centering cone member 20 is supported against the main shaft 1 by way of a spring such as a coil compression spring as indicated at 21 or other suitable device for producing a biasing force which is directed axially in opposite relationship with respect to a clamping force acting between the wheel 19 and the centering cone member 20.

Further details of the wheel-clamping arrangement will be set forth hereinafter.

In the operation of initially clamping the wheel 19 on the shaft 1, as will be described in further detail below, the pulling rod 2 is moved towards the left in the FIGURE, whereby the wheel 19 is pressed with a central hole 33 thereof against the centering cone member 20. The biasing force produced by the spring 21 acts in opposite relationship to that pressing force. In that case, the wheel 19 when clamped fast against the centering cone member 20 is pressed against a flange 18 which is suitably fixed to the main shaft 1, for example by screws.

The clamping apparatus illustrated in the FIGURE involves a clamping arrangement in which the centering cone member 20 is mounted on the shaft 1 displaceably in the axial direction thereof and in coaxial relationship therewith, with the biasing force being produced by the cylindrical coil compression spring 21. A clamping arrangement of that kind is to be found for example in DE 195 11 405 A1 to which reference may be directed for details of the structural configuration involved herein.

In the case of the clamping apparatus illustrated in the FIGURE the motor vehicle wheel 19 is further clamped against the centering cone member 20 on the shaft 1, by means of a generally cup-shaped pressure member 14 fixed to a clamping sleeve 28. For that purpose the clamping sleeve 28 carrying the pressure member 14 can be fixedly connected for example by screw means to the projecting axial end of the pulling rod 2, which is thus at the right-hand side of the FIGURE. In the illustrated embodiment the pulling rod 2 is connected at its right-hand end to the clamping sleeve 28 by way of claws 29 in a scissor-like configuration. The claws 29 can engage into various recesses provided at the inside wall surface of the clamping sleeve 28. The illustrated structure has by way of example four peripherally extending recesses forming engagement grooves for the claws 29 to be selectively engaged therein. The claws 29 are urged radially outwardly by a spring into the respective peripherally extending engagement groove on the inside of the clamping sleeve 28.

The clamping apparatus however can also be of such a configuration as is disclosed in above-mentioned U.S. Pat. No. 5,615,574 (corresponding to EP 0 550 816 B1 and DE 42 00 380 C2). In that configuration of a clamping apparatus the centering cone member is supported against the clamping sleeve by way of a scissor-like support arrangement. The scissor-like support arrangement is subjected to the biasing force of a tension spring which biases the support arrangement in the direction of a closed position. In this case, the scissor-like support arrangement has two free ends which are displaceable in a radial direction and which are possibly supported against an end abutment at the rear side of the centering cone member. In that case the biasing force is afforded by the tension spring which biases the scissor-like support arrangement in the closing direction.

Referring now again to the FIGURE the pulling rod 2 has a screwthread 9 at its end remote from the clamping arrangement, being therefore the left-hand end in the FIGURE. The screwthread 9 is provided on a cylindrical threaded portion 24 connected to the left-hand end of the pulling rod 2 by way of a support disk 23 which is possibly of a resilient nature. A female screwthread of a clamping nut indicated at 4 in the drawing is in engagement with the screwthread 9 forming a male screwthread on the cylindrical threaded portion 24. The clamping nut 4 is fixed to a pulley 3 which is supported rotatably on the shaft 1 of the balancing machine in bearing assemblies diagrammatically indicated at 12 and 13. The pulley 3 can be driven in rotation by an electric motor 6 by way of a belt drive indicated at 7.

Reference numeral 5 indicates a brake which is preferably in the form of an electromagnetic brake, for braking the main shaft 1 which is rotatably mounted in bearing assemblies indicated at 10 and 11 on the frame of the balancing machine or on oscillator members 8. The brake 5 has an electromagnet 22 in a stator of the brake, and an armature 16 which is preferably in the form of an armature disk. The armature disk 16 is connected to the shaft 1 by way of a flange hub 17. The shaft 1 can be brought to a halt by actuation of the brake 15.

When the wheel 19 is clamped to the shaft 1 of the balancing machine, the armature 16 is attracted to the stator of the brake 5 by virtue of the electromagnet 22 being powered, so that the shaft 1 is locked to prevent rotary movement thereof. The electric motor 6 is switched on and thus causes the pulley 3 and the clamping nut 4 to be rotated so that the pulling rod 2 is moved axially towards the left in the FIGURE. As a result, the wheel 19 is clamped fast on the shaft 1 by means of the above-discussed clamping means.

In the release procedure, with the brake 5 in the activated condition, that is to say with the main shaft 1 held stationary, the direction of rotation of the electric motor 6 and therewith the nut 4 is reversed so that the pulling rod 2 is moved towards the right in the FIGURE. That eliminates the clamping force with which the wheel 19 is clamped against the support flange 18 fixed to the shaft 1.

The clamping and release procedure can also be implemented in the manner described in above-mentioned U.S. Pat. No. 5,615,574.

In order to at least substantially avoid the risk of centering errors, in particular in the form of deviations of the geometrical axis of the wheel from the axis of rotation of the shaft 1, a post-centering operation is carried out at the beginning of an unbalance measuring procedure. The post-centering operation provides that the wheel 19 is exactly centered on the centering cone member 20. That post-centering operation is implemented under the control of an electronic control device diagrammatically indicated at 25 which can be provided in the electronic system of the machine in the form of a program or in the form of additional electronic components, or can be appropriately integrated therein. The electronic control device 25 can be activated automatically when the unbalance measuring operation is initiated. That can preferably be effected by the electronic control device 25 also being switched on for the post-centering operation, when the electric motor 6 is switched on for carrying out the unbalance measuring run. In the case of a conventional wheel balancing machine the system is usually started for example by closing a wheel guard hood, which provides for actuation of an on/off switch 30. It is however also possible for the electronic control device 25 to be activated to carry out the post-centering operation by means of a separate switch as indicated at 31, for example a push-button switch.

When carrying out the post-centering operation, when switching on the apparatus, for example by closure of the above-mentioned wheel guard hood, the brake 5 is actuated by the control device 25 so that the armature 16 is non-rotatably connected to the pulley 3. That causes the main shaft 1 of the wheel balancing machine to be coupled to the electric motor 6. The armature 16 of the brake 5 thus performs a dual function and, in the position illustrated in the FIGURE in which it is non-rotatably coupled to the pulley 3, it acts as a coupling for non-rotatably connecting the main shaft 1 to the electric motor 6 while when it is attracted to the stator it serves as a brake for stopping the shaft 1.

To initiate the post-centering operation the electric motor 6 is driven at a low rotary speed which is substantially less than the rotary speed involved when carrying out the unbalance measuring run. In the course of that slow rotary movement the wheel 19 which is thus clamped on the shaft 1 is displaced with respect to its initial rotary angle position, into a rotary angle position which is altered through about 180°± about 20°. In this procedure the wheel 19 can rotate for example through approximately half a revolution or can rotate through a plurality of revolutions and is stopped at the desired rotary angle position at an angular spacing of about 180° relative to the initial position. To stop the wheel in the desired position the electromagnet 22 of the brake 5 is powered so that the armature 16 is attracted and the shaft 1 with the wheel 19 carried thereon are stopped. If the direction of rotation in which the electric motor 6 is driven corresponds to the direction of rotation with which the pulling rod 2 is moved towards the right in the FIGURE, being therefore the direction for releasing the wheel 19 from its clamped condition on the shaft 1, the motor drive can be maintained so as to provide for at least partial release of the wheel 19. If the direction of drive rotation of the electric motor 6 is not the same as the desired wheel-release direction, the direction of rotation of the electric motor 6 is reversed.

It will be appreciated that the wheel 19 can also be moved manually into the rotary angle position in which it is changed through about 180° with respect to its initial position.

For at least partially releasing the wheel 19, the pulling rod 2 is displaced towards the right in the FIGURE by rotation of the pulley 3 and the clamping nut 4, until the wheel 19 is released from the support flange 18. Preferably in that procedure the direction of movement of the pulley 3 is sensed by means of a sensing device diagrammatically indicated at 27. For that purpose, the pulley 3 may carry markings which represent incremental angular steps for the sensing device 27. The corresponding measurement signals generated by the sensing device 27 which thus constitutes an incremental sensor are passed to the control device 25 which, when the wheel 19 is sufficiently released, stops the rotary movement of the electric motor 6. It will be seen therefore that this provides for sensing of the axial movement of the pulling rod 2 in the phase of at least partially releasing the wheel 19 during the post-centering procedure.

In addition, the released condition of the wheel can be ascertained by detecting a drop in the current which flows through the electric motor 6 and which is measured during the wheel-releasing procedure.

When the wheel is in the at least partially released condition there is an only small gap between the support flange 18 and the wheel 19. The gap is of such a size that self-centering of the wheel on the centering cone member 20 can take place under the effect of the force of gravity acting on the wheel. More precisely, if, in the initial clamped condition, the wheel 19 is not seated in an exactly centered position on the centering cone member 20, that can be rectified by the approximately 180° rotary movement of the wheel 19 with respect to the initial rotary angle position thereof. Thus, that rotary movement of the wheel 19 means that the center of gravity of the wheel 19 is above the axis of the centering cone member 20, which coincides with the axis of rotation of the shaft 1. The force of gravity acting on the wheel will thus tend to move the wheel 19 downwardly towards the exactly centered position on the centering cone member 20 while in addition the biasing force of the spring 21 will cause the centering cone member 20 to be pressed into the central bore 33 in the wheel 19 to provide for exact centering thereof.

The electric motor 6 is then switched on again by the control device 25 and, with the shaft 1 being held stationary by the brake 5, the pulling rod 2 is displaced towards the left in the FIGURE by the drive from the electric motor 6, for clamping the wheel 19 again on the shaft 1.

The respective rotary angle position of the shaft 1 and therewith the wheel 19 can be established by means of the sensing device 27. Preferably however separate sensing of the respective rotary angle position is effected by means of a rotary angle sensor 32 which is operable to sense rotary angle incremental markings provided on or fixed to the shaft 1.

In the illustrated embodiment the degree of release of the wheel 19 in the post-centering operation can be adjusted in dependence on the biasing force exerted by the spring 21. For that purpose, the arrangement may have, with the control device 25, a corresponding memory 26 for storing the value of the respective biasing force produced by the spring 21. With different clamping means, the corresponding values for the biasing force can then be inputted into the memory 26.

After the post-centering operation is terminated the brake 5 is released by switching off the power to the electromagnet 22. The torque produced by the electric motor 6 is then transmitted by way of the pulley 3 to the shaft 1 for accelerating it to the rotary speed required for carrying out a measuring run.

It will be appreciated that the above-described embodiment of the method and apparatus according to the invention has been set forth solely by way of example and illustration of the principles thereof and that various modifications and alterations may be made therein without thereby departing from the spirit and scope of the invention.

What is claimed is:

1. A method of centeredly clamping a motor vehicle wheel on a main shaft of a balancing machine, the method including the steps of:

applying an axially directed clamping force on a centering cone member on the main shaft to clamp the wheel, applying an axially directed biasing force opposite to the clamping force operative between the wheel and the centering cone member, rotating the wheel through a rotary angle of at least about 180°, at least partially releasing the wheel for post-centering thereof, and clamping the wheel at the main shaft again.

2. A method as act forth in claim 1, wherein said step of rotating the wheel occurs prior to said step of at least partially releasing the wheel for post-centering.

3. A method as set forth in claim 1, wherein said step of rotating the wheel occurs after said step of at least partially releasing the wheel for post-centering.

4. A method as set forth in claim 1, wherein said step of rotating the wheel occurs during said step of at least partially releasing the wheel for post-centering.

5. A method of centeredly clamping a motor vehicle wheel on a main shalt of a balancing machine, the method including:

applying an axially directed clamping force on a centering cone member on the main shaft to clamp the wheel, applying an axially directed biasing force and opposite to the clamping force to act between the wheel and the centering cone member, and performing a post-centering operation by rotating the wheel through a rotary angle of at least about 180°, at least partially releasing the wheel, and then clamping the wheel again.

6. A method as set forth in claim 5, further comprising performing an unbalance measuring run, wherein the step of performing said post-centering operation includes rotating the wheel at a substantially lower rotary speed than the rotary speed of the wheel during the unbalance measuring run.

7. A method as set forth in claim 5 further comprising automatically performing the post-centering operation at the beginning of an unbalance measuring procedure.

8. A method as set forth in claim 5 further comprising selecting a program at the beginning of an unbalance measuring procedure to perform the post-centering operation.

9. A method as set forth in claim 5, wherein the wheel is at least partially released by rotating a pulley to displace a pulling rod extending through an axial bore in the main shaft.

10. A method as set forth in claim 5, wherein the wheel is at least partially released after stopping the wheel at a rotary angle position about 180° from the rotary angle position of the wheel prior to rotating the wheel.

11. A method as set forth in claim 5 further comprising performing the post-centering operation a plurality of times.

12. A method as set forth in claim 5, further comprising electronically controlling the post-centering operation.

13. A method as set forth in claim 5, wherein the extent of which said at least partially releasing the wheel is controlled in dependence on the biasing force.

14. A method as set forth in claim 5, further comprising rotating the shaft clamping and releasing the wheel by operation of an electric motor, and measuring an amount of current flowing in the electric motor.

15. Apparatus for centeredly clamping a motor vehicle wheel on a main shaft of a wheel balancing machine, the apparatus comprising:

a centering cone member coaxially placed on the main shaft;

clamping means for clamping a motor vehicle wheel on the main shaft, the clamping means being displaceable between a clamping position of clamping a motor vehicle wheel on the main shaft and a release position of releasing the motor vehicle wheel from the main shaft, drive means for driving the clamping means axially of the main shaft between said clamping and release positions, control means for controlling motion of the clamping means, the control means including a control device, and a sensing device connected to the control device and operable to sense movement of the clamping means, wherein the control device is operable in such a way that when an unbalance measuring operation starts the clamping means are controlled into a release position when the motor vehicle wheel is rotated about 180° for post centering of the motor vehicle wheel.

16. Apparatus as set forth in claim 15 wherein the control device is programmed for a desired mode of operation.

17. Apparatus as set forth in claim 15 wherein the control device is programmable for a desired mode of operation.

18. A method as set forth in claim 9, wherein the wheel is at least partially released by sensing when the pulley moves and/or the pulley's direction of movement.

19. An apparatus for centeredly clamping a motor vehicle wheel on a main shaft of a wheel balancing machine, the apparatus comprising:

a centering cone member coaxially placed on the main shaft, a clamp operative to clamp a motor vehicle wheel on the main shaft, the clamp being displaceable between a clamping position of clamping a motor vehicle wheel on the main shaft and a release position of releasing the motor vehicle wheel from the main shaft, a drive operative to drive the clamp axially of the main shaft between said clamping and release positions, a controller operative to control motion of the clamp, the controller including a control device, and a sensing device connected to the control device and operable to sense movement of the clamp, wherein the control device is operable in such a way that when an unbalance measuring operation starts the clamp is controlled into a release position when the motor vehicle wheel is rotated about 180° for post-centering the motor vehicle wheel.

* * * * *